B. F. McMINN.
DISH WASHING APPARATUS.
APPLICATION FILED OCT. 28, 1909.
967,957.
Patented Aug. 23, 1910.
2 SHEETS—SHEET 1.
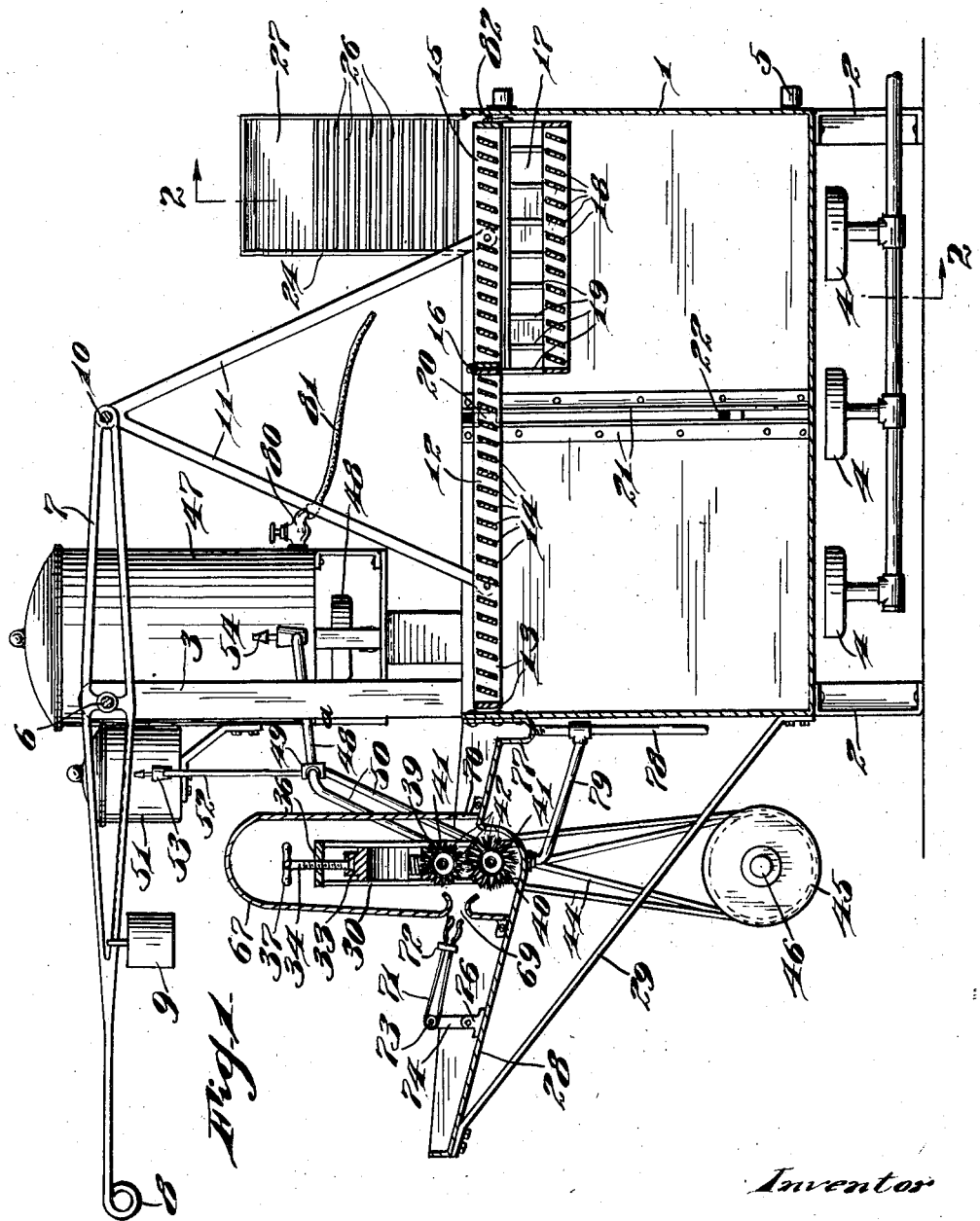
Witnesses
Inventor
Benjamin F. McMinn,
By Joshua R. H. Potts
Attorney B. F. McMINN.
DISH WASHING APPARATUS.
APPLICATION FILED OCT. 28, 1909.
967,957.
Patented Aug. 23, 1910.
2 SHEETS—SHEET 2.
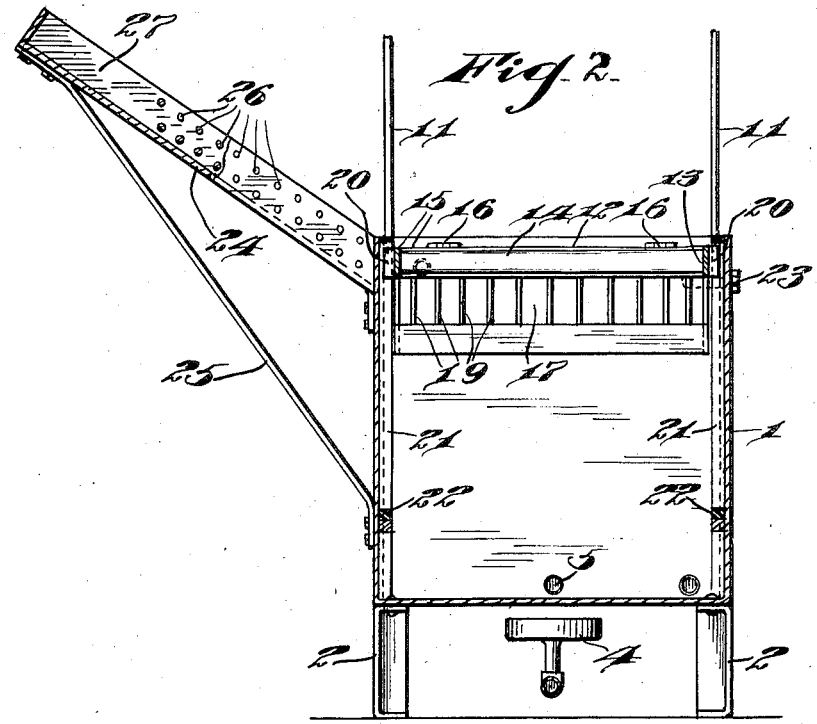
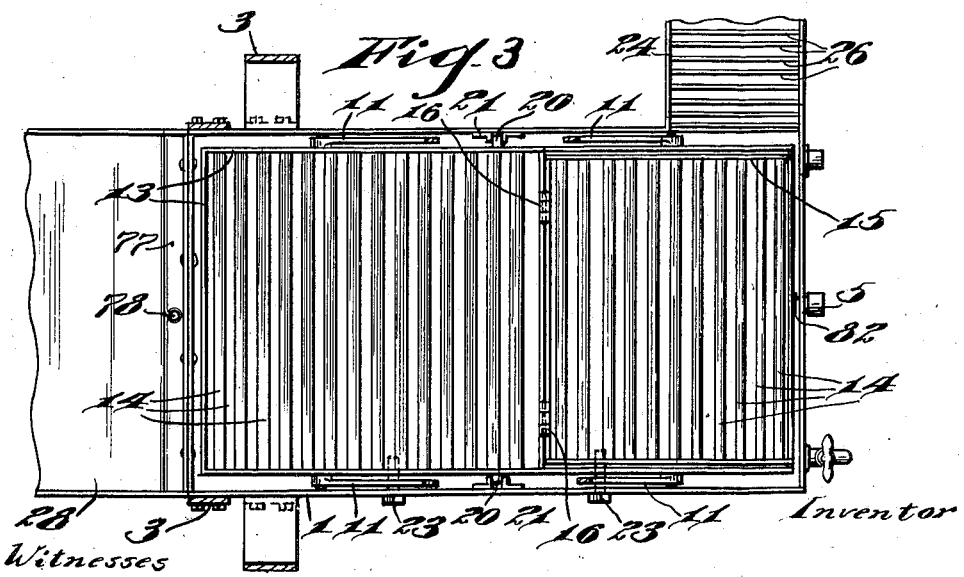
Witnesses
Thos. Rosemond.
S. W. Foster
Inventor
Benjamin F. McMinn,
By Joshua R. H. Potts
Attorney

UNITED STATES PATENT OFFICE.

BENJAMIN F. McMINN, OF PHILADELPHIA, PENNSYLVANIA.

DISH-WASHING APPARATUS.

967,957.

Specification of Letters Patent. Patented Aug. 23, 1910.

Application filed October 28, 1909. Serial No. 525,009.

*To all whom it may concern:*

Be it known that I, BENJAMIN F. MC-MINN, a citizen of the United States, residing at Philadelphia, in the county of Philadelphia and State of Pennsylvania, have invented certain new and useful Improvements in Dish-Washing Apparatus, of which the following is a specification.

My invention relates to improvements in dish washing apparatus, an object of the invention being to provide improved means whereby the dishes and other articles to be washed, may be immersed in hot water, or other cleansing fluid, and may be moved up and down through this cleansing fluid to thoroughly cleanse them.

A further object is to provide an improved tray, having supports for dishes, and a compartment for cups and other smaller articles.

A further object is to provide improved apparatus of this character, which will most effectually cleanse dishes and other table ware, and which is especially designed for use in hotels and restaurants, where quantities of such articles must be cleansed each day.

With these and other objects in view the invention consists in certain novel features of construction and combinations and arrangements of parts as will be more fully hereinafter described and pointed out in the claim.

In the accompanying drawings, Figure 1, is a view in vertical longitudinal section, illustrating my improvements. Fig. 2, is a view in transverse section on the line 2—2 of Fig. 1. Fig. 3, is a fragmentary plan view.

1 represents a tank, which is preferably of rectangular form, and made of sheet metal supported upon suitable feet 2, and provided near one end with uprights 3. This tank 1 is adapted to contain hot water, preferably soapy water, or impregnated with some washing powder or fluid to more thoroughly cleanse the dishes. Where an abundant supply of hot water is to be had, no water heating means is necessary in the tank, but where this is not the case, the water in the tank may be heated by ordinary gas burners 4, or a steam pipe may enter the tank through the plugged opening 5, or any other suitable means may be provided for heating water.

The upper ends of uprights 3, are connected by a cross rod 6, and a lever 7 is fulcrumed between its ends on this rod 6, and is provided at one end with a handhold 8. The lever is preferably of the trussed or walking beam form illustrated, and provided with a movable counterweight 9 at one side of its fulcrum, adapted to be positioned to balance the other end of the lever, when supporting the dishes to be washed. One end of this lever 7 is positioned centrally above tank 1, and is provided with a cross rod 10, the latter connected by rods or braces 11 with my improved dish supporting tray 12. The tray 12 may, of course, be made in various ways, one preferred form being shown in which a rectangular frame work 13 is provided, connected by strips 14, constituting slats between which the dishes can be readily positioned and removed. One end of this tray comprises a section or cover 15, connected by hinges 16 with the main portion of the tray, and below this cover, a receptacle 17 is provided for cups and smaller articles. The bottom 18 of this receptacle is also of slatted form and is connected by rods or uprights 19 with the frame of tray 12, the cover 15 serving to prevent the smaller articles, such as cups, being washed up out of the receptacle, when the tray is moved up and down in the water in tank 1.

To prevent any oscillatory movement of the tray 12 in tank 1, lugs 20 are provided at opposite sides of the tray at its center, and move in guides 21, formed by angle irons secured to the inner face of the tank, and in the lower ends of these guides, cushioning blocks 22 are located and secured, and serve to limit the downward movement of the tray, preventing any possibility of the dishes which project through the tray, from striking the bottom of the tank.

To hold the tray in its highest position while being filled with dishes, movable bolts or plugs 23 are provided, and are adapted to be projected below the tray and hold it against downward movement, said bolts being withdrawn when the tray is to be moved up and down in the tank.

24 represents a drain board, which is located at an angle as shown, and supported by a suitable brace 25, connecting the drain board to tank 1. This drain board is provided with a series of cross wires, forming partitions 26, between which the dishes are to be placed when draining, a compartment 27 being provided at the top of the drain for smaller articles, and as well understood, when such articles are subjected to clear hot water, they will quickly dry without the necessity of wiping them.

80 represents a cock which is located on the hot water tank 47, and 81 is a flexible hose connected to this cock 80 so that when the cock is opened the hose 81 may be manipulated to throw the clean hot water upon the articles on rinsing tray 24, or elsewhere about the apparatus as may be desired.

The operation is as follows: Cups and smaller articles are placed in the compartment 17 and the cover fastened down in any suitable manner, a hook 82 being provided for the purpose. When the tray 12 is filled and the weight 9 moved so as to properly balance it the bolts 23 are withdrawn and the operator clasping hand-hold 8 moves the tray up and down through the water in tank 1, to thoroughly cleanse the dishes They are then removed from the tray and placed in the rinsing or draining tray 24, where they may be thoroughly rinsed by hot water directed from pipe 81, and left to dry.

A great many slight changes might be made in the general form and arrangement of parts described without departing from my invention and hence I do not restrict myself to the precise details set forth but consider myself at liberty to make such changes and alterations as fairly fall within the spirit and scope of the appended claim.

Having thus described my invention what I claim as new and desire to secure by Letters Patent is:—

In an apparatus of the character described, the combination with a tank adapted to contain cleansing fluid, of vertical guides at opposite sides of said tank, a tray mounted to reciprocate vertically in the tank, comprising a horizontal plate-supporting rack, one section of said rack hinged, and said tray having a receptacle located below the hinged section, lugs on opposite sides of the tray mounted to move in the guides, and means in the guides limiting the movement of the lugs and tray.

In testimony whereof I have signed my name to this specification in the presence of two subscribing witnesses.

BENJAMIN F. McMINN.

Witnesses:
 A. HEISER,
 S. W. FOSTER.